United States Patent
Usami

(10) Patent No.: US 6,209,049 B1
(45) Date of Patent: Mar. 27, 2001

(54) DATA PROCESSING SYSTEM AND METHOD FOR INPUTTING DATA FROM STORAGE DEVICES WHERE THE DATA BUSS WIDTH FOR INPUT DEPENDS ON THE NUMBER OF MEMORY DEVICES

(75) Inventor: Hajime Usami, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/184,602

(22) Filed: Nov. 2, 1998

(30) Foreign Application Priority Data

Oct. 31, 1997 (JP) .................................................. 9-301308

(51) Int. Cl.[7] .................................................. G06F 13/12
(52) U.S. Cl. .............................................. 710/66; 711/115
(58) Field of Search ........................... 710/66, 125; 711/5, 711/115

(56) References Cited

U.S. PATENT DOCUMENTS

| | | | |
|---|---|---|---|
| Re. 36,052 | * 1/1999 | Kobayashi et al. | 710/127 |
| 4,716,527 | * 12/1987 | Graciotti | 703/25 |
| 4,860,198 | * 8/1989 | Takenaka | 710/127 |
| 5,070,445 | * 12/1991 | Woodward | 710/66 |
| 5,539,912 | * 7/1996 | Clarke, Jr. et al. | 710/104 |
| 5,548,766 | * 8/1996 | Keaneko et al. | 710/127 |
| 5,802,392 | * 9/1998 | Epstien et al. | 710/4 |
| 5,835,960 | * 11/1998 | Keene et al. | 711/172 |

* cited by examiner

*Primary Examiner*—Jack Choules
(74) *Attorney, Agent, or Firm*—Pitney, Hardin, Kipp & Szuch LLP

(57) ABSTRACT

A data processing system and a method for inputting data from storage devices provided in the data processing system, in which the ROM address areas in a memory map include an area for reading in a 32-bit bus mode and an area for reading in a 16-bit mode, which areas are set so that a portion of the addresses are equal. When a 32-bit data read is performed for the area used to read in 32-bit bus mode and the high-order 16 bits are invalid, it is determined that only one ROM device is mounted in the system. Therefore, accesses are performed with the area used to read in 16-bit bus mode. After determining the number of ROM devices in this way, the result is written to a mode register. The selector reads this result stored in the mode register and, when only one ROM device is mounted in the system, supplies Address A1 to the highest-order address terminal RA17 of the ROM device.

18 Claims, 6 Drawing Sheets

FIG. 5

| | $A_3$ $A_2$ $A_1$ $A_0$ | | | | |
|---|---|---|---|---|---|
| | 0 0 0 0 } 0 | 1 1 0 0 } C | 0 0 0 0 } 0 | 1 1 0 0 } C |
| | $A_7$ $A_6$ $A_5$ $A_4$ | | | | |
| | 0 0 0 0 } 0 | 1 1 1 1 } F | 0 0 0 0 } 0 | 1 1 1 1 } F |
| | $A_{11}$ $A_{10}$ $A_9$ $A_8$ | | | | |
| | 0 0 0 0 } 0 | 1 1 1 1 } F | 0 0 0 0 } 0 | 1 1 1 1 } F |
| | $A_{15}$ $A_{14}$ $A_{13}$ $A_{12}$ | | | | |
| | 0 0 0 0 } 0 | 1 1 1 1 } F | 0 0 0 0 } 0 | 1 1 1 1 } F |
| | $A_{19}$ $A_{18}$ $A_{17}$ $A_{16}$ | | | | |
| | 0 0 0 0 } 0 | 0 1 1 1 } 7 | 0 0 0 0 } 0 | 0 1 1 1 } 7 |
| | $A_{23}$ $A_{22}$ $A_{21}$ $A_{20}$ | | | | |
| | 0 0 0 0 } 0 | 0 0 0 0 } 0 | 0 0 0 0 } 0 | 0 0 0 0 } 0 |
| | $A_{27}$ $A_{26}$ $A_{25}$ $A_{24}$ | | | | |
| | 1 1 0 0 } C | 1 1 0 0 } C | 1 0 0 0 } B | 1 0 0 0 } B |
| | $A_{31}$ $A_{30}$ $A_{29}$ $A_{28}$ | | | | |
| | 0 0 0 0 } 0 | 0 0 0 0 } 0 | 0 0 0 1 } 1 | 0 0 0 1 } 1 |
| | $0C00-0000 ~ $0C07-FFFF | | $1800-0000 ~ $1807-FFFF | |
| | CS#0 | | CS#1 | |

DATA PROCESSING SYSTEM AND METHOD FOR INPUTTING DATA FROM STORAGE DEVICES WHERE THE DATA BUSS WIDTH FOR INPUT DEPENDS ON THE NUMBER OF MEMORY DEVICES

BACKGROUND OF THE INVENTION

1. Field of the Invention

The present invention relates to a data processing system and a method performed by a CPU for inputting data at a prescribed bit width from storage devices, such as flash ROM, in a data processing system.

2. Description of the Prior Art

Conventional data processing systems provided with a CPU include a program ROM for storing control programs used by the CPU to execute prescribed control processes: data ROM for storing data to be referenced during those control processes: RAM that serves as a work area during those control processes for performing input and output of data; I/O interface for executing in hardware data input and output between external devices; and the like.

Each of these storage devices contains storage space that can be accessed by the CPU. Addresses are assigned for the storage spaces of each storage device such that the addresses do not overlap. The CPU can access each of the storage devices by outputting the relevant address data.

However, the storage space contained in individual storage devices is generally smaller than the total address space that can be accessed by the CPU. Therefore, an address decoder is normally positioned between the CPU and the storage devices. The address decoder executes processes to generate the address of each storage device based on address data outputted from the CPU.

Occasionally, the width of the I/O data bus used by the CPU is different from that of the data bus for the storage devices. Therefore, some conventional systems employ a configuration in which a plurality of storage devices are arranged together and made to conform to the I/O data width of the CPU using the address decoder.

For example, a 32-bit CPU has a 32-bit data bus. However, the data buses in the program ROM and data ROM currently have a maximum width of 16 bits. Hence, conventional systems have used the two ROM devices together to form a 32-bit data bus width.

However, this configuration can be wasteful because it necessitates that two ROM devices be always provided, regardless of how small the necessary ROM capacity is. Printing devices, for example, can be mounted with data ROM for storing various user-specific data based on user requests. For a user who only prints on special thick paper, for example, modifiable data is stored in the data ROM to indicate the fixing temperature should be higher than normal. In addition, special font data may be stored in the data ROM for users who print characters of special languages.

The size of this user-specific data can change drastically according to specifications of the user. One user may require about 1 MB of data, while another can get by on about 0.5 MB of data.

When 1 MB of data is required, it is possible to provide two ROM memories of 0.5 MB each. However, for the user that only requires about 0.5 MB of data, it will still be necessary to provide two ROM memories of 0.5 MB, due to the CPU data bus width problem described above. It is very difficult to find flash memory in sizes less than 0.5 MB.

Various methods can be considered to overcome this problem, such as changing the hardware configuration for each user or changing the software configuration so that data input to the CPU is performed at a lesser data bus width. However, changes in the hardware and software configurations can be expensive.

SUMMARY OF THE INVENTION

In view of the foregoing, it is an object of the present invention to provide a data processing system and particularly a method of inputting data from storage devices in the data processing system, in order that accesses to the storage devices can be performed at either the same data bus width as the system data bus width or a width smaller than the system data bus width without changing the hardware and software configurations.

This and other objects of the present invention will be attained by a data processing system including a data processing device for switching a process data input mode for each prescribed area in the total address space between a first mode, in which data is input at a first number of bits, and a second mode, in which data is input at the first number of bits by performing a plurality of inputs at a second number of bits smaller than the first number of bits; storage devices for outputting process data at the second number of bits; and an address data converter for converting address data for the storage devices.

The data processing device includes an address data output device used to output address data for selecting an external device having a prescribed area allocated in the total address space; a storage device number determination device for determining the number of storage devices; and a process data input device for inputting process data from the storage devices, using either a first address area by the first mode or a second address area by the second mode, based on the results of the determination performed by the storage device number determination device. The address data converter includes an address data extraction device for extracting necessary address data and outputting the necessary data to the storage devices based on whether the address data from the data processing device corresponds to the first or second area of memory, in order to effect either the output of process data from a plurality of storage devices equivalent to the first number of bits or process data output at the second number of bits; and a selecting device for outputting signals based on the address data to select the storage devices. The storage devices are connected to at least one of connection devices that connect to the address data extraction device via an address data line and the data processing device via a process data line.

With this construction, when it is determined according to the storage device number determination device of the data processing device that the number of storage devices is a number at which process data can be input at the first number of bits, then the process data input device inputs process data from the storage device in the first mode using the first address area. That is, address data corresponding to the first address area is output from the data processing device. The address data converter employs the address data extraction device to extract address data needed to induce a plurality of storage devices to output process data equivalent to the amount of the first number of bits, and outputs the address data to the storage device. Based on this address data, the selection device outputs a selection signal for selecting the storage devices. In response, the storage devices output process data equivalent to the first number of bits.

On the other hand, if the storage device number determination device of the data processing device determines that the number of storage devices is not capable of inputting process data at the first number of bits, process data is input from the storage devices in the second mode using the second address area. That is, address data corresponding to the second address area is output from the data processing device. The address data converter employs the address data extraction device to extract address data needed to induce a plurality of storage devices to output process data equivalent to the amount of the second number of bits, and outputs the address data to the storage device. Based on this address data, the selection device outputs a selection signal for selecting the storage devices. In response, the storage devices output process data equivalent to the second number of bits. Since the data processing device outputs address data several times, the input is performed several times at the second number of bits. Therefore, input at the first number of bits is achieved through several inputs at the second input of bits.

In this way, input at the first number of bits is accomplished by inputting a number of bits that suits the number of storage devices connected to the connection device, which in turn is connected to the data processing device via a process data line. Hence, when the required capacity of the storage devices is small, the number of storage devices can be decreased to eliminate wastefulness.

In another aspect of the invention, the first number of bits is a multiple of the amount of the second number of bits. The address data extraction device of the address data converter generates address data for the storage devices by arranging low-order address data of a bit number capable of expressing the value of the multiple number above in the highest-order bit side.

With this construction, the address progression used when reading data at the first number of bits is a multiple of the address progression used when reading data at the second number of bits. Accordingly, when addressing the lowest order address of the storage device so as to read data at the first number of bits, a conversion device is necessary to shift the entire address of the recording device. However, the present invention generates address data for the storage devices by arranging the low order address area for the number of bits that can express the multiple value in the highest-order bit side. Therefore, it is possible to read data at the second number of bits without changing the addressing of the low-order address in the storage device. Since the low order address data is input into the highest-order address terminal of the recording device, the available capacity of the storage device is decreased when reading data at the second number of bits. However, when reading data at the second number of bits, little capacity of the storage device is needed and, therefore, the decreased capacity is not a problem.

In another aspect of the invention, the data processing device further includes a bit width determining device for determining, based on results of the storage number determination device, the bit width of process data input from the storage devices. The address data converter further includes a bit width data storage device for storing data regarding the bit width determined by the bit width determining means. The address data extraction device selects user address data necessary for selecting, based on bit width data stored in the bit width data storage device, either address data necessary for inducing a plurality of storage devices to output process data equivalent to the first number of bits or address data necessary for inducing a storage device to output process data at the second number of bits.

With this construction, the bit width determining means of the data storage device determines the bit width of the process data to be input from the storage device based on the results of the storage number determination device. Data concerning the bit width determined above is stored in the bit width data storage device. Based on the bit width data stored in the bit width data storage device, the address data extraction device of the address data converter selects either the address data needed to induce a plurality of storage devices to output process data equivalent to the first number of bits or address data necessary to induce a storage device to output process data at the second number of bits. Hence, a common system can be used without requiring changes in hardware and software to read data at an appropriate bit width corresponding to the number of storage devices connected to the connection device.

In another aspect of the invention, the storage device number determination device for determining the number of storage devices determines that number based on the contents of process data at the first number of bits, which is input to correspond to address data equivalent to the first address area.

When the number of storage devices is capable of outputting data at the first number of bits, all bits of the bit width are valid for process data of the first number of bits, which is input corresponding to address data equivalent to the first address area by the process data input device. However, when the number of storage devices is not sufficient to output data at the first number of bits, some of the bits in the first bit width are invalid. Therefore, the storage device number determination device can accurately determine the number of storage devices based on the contents of the process data at the first number of bits.

In another aspect of the invention, a method for inputting data from storage devices in a data processing system, wherein the data processing system includes a data processing device for switching a process data input mode for each prescribed area in the total address space between a first mode, in which data is input at a first number of bits, and a second mode, in which data is input at the first number of bits by performing a plurality of inputs at a second number of bits smaller than the first number of bits; storage devices for outputting process data at the second number of bits; and an address data converter for converting address data for the storage devices.

The method of data input from the storage devices includes an outputting process for outputting address data to select external devices each having a prescribed address area allocated in the total address space; a determining process for determining the number of storage devices; an inputting process for inputting process data from the storage devices, using either a first address area by the first mode or a second address area by the second mode, based on the results of the determining process; an address data extraction and outputting process for extracting necessary address data and outputting the necessary data to the storage devices based on whether the address data from the data processing device corresponds to the first or second area of memory in order to effect either the output of process data from a plurality of storage devices equivalent to the first number of bits or process data output at the second number of bits; and a selecting process for outputting signals selecting the storage device based on the address data.

With this method, when it is determined according to the determining process that the number of storage devices is a number at which process data can be input at the first number of bits, then the process data input device inputs process data from the storage device in the first mode using the first address area. That is, address data corresponding to the first address area is output from the data processing device. The address data converter employs the address data extraction device to extract address data needed to induce a plurality of storage devices to output process data equivalent to the amount of the first number of bits, and outputs the address data to the storage device. Based on this address data, the selection device outputs a selection signal for selecting the storage devices. In response, the storage devices output process data equivalent to the first number of bits.

On the other hand, if the determining process of the data input method determines that the number of storage devices is not capable of inputting process data at the first number of bits, process data is input from the storage devices in the second mode using the second address area. That is, address data corresponding to the second address area is output from the data processing device. The address data converter employs the address data extraction device to extract address data needed to induce a plurality of storage devices to output process data equivalent to the amount of the second number of bits, and outputs the address data to the storage device. Based on this address data, the selection device outputs a selection signal for selecting the storage devices. In response, the storage devices output process data equivalent to the second number of bits. Since the data processing device outputs address data several times, the input is performed several times at the second number of bits. Therefore, input at the first number of bits is achieved through several inputs at the second input of bits.

In this way, input at the first number of bits is accomplished by inputting a number of bits that suits the number of storage devices connected to the connection device, which in turn is connected to the data processing device via a process data line. Therefore, when the required capacity of the storage devices is small, the number of storage devices can be decreased to eliminate wastefulness.

In another aspect of the invention, the first number of bits is a multiple of the second number of bits. The address data extracting and outputting process generates address data for the storage devices by arranging the low order address data of a bit number capable of expressing the value of the multiple number above in the highest order bit.

With this construction, the address progression used when reading data at the first number of bits is a multiple of the address progression used when reading data at the second number of bits. Accordingly, when addressing the lowest order address of the storage device so as to read data at the first number of bits, a conversion process is necessary to shift the entire address of the recording device. However, the present invention generates address data for the storage devices by arranging the low order address area for the number of bits that can express the multiple value in the highest order bit. Therefore, it is possible to read data at the second number of bits without changing the addressing of the lowest order address in the storage device. Since the low order address data is input into the highest order address terminal of the recording device, the available capacity of the storage device is decreased when reading data at the second number of bits. However, when reading data at the second number of bits, little capacity of the storage device is needed and, therefore, the decrease in capacity is not a problem.

In another aspect of the invention, the method for inputting data from storage devices in a data processing system further includes a bit width determining process for determining, based on results of the storage number determination process, the bit width of process data input from the storage devices; a bit width data storing process for storing data regarding the bit width determined by the bit width determining process; an address data selecting process for selecting, based on the stored bit width data, either address data necessary for causing a plurality of storage devices to output process data equivalent to the first number of bits or address data necessary for causing a storage device to output process data at the second number of bits.

With this method, the bit width determining process of the data input method determines the bit width of the process data to be input from the storage device based on the results of the storage number determination process. Data concerning the bit width determined above is stored in memory. Based on the stored bit width data, the address data conversion device selects either the address data needed to induce a plurality of storage devices to output process data equivalent to the first number of bits or address data necessary to induce a storage device to output process data at the second number of bits. Hence, a common system can be used without requiring changes in hardware and software to read data at an appropriate bit width corresponding to the number of storage devices connected to the connection device.

In another aspect of the invention, the storage number determination process for determining the number of storage devices determines that number based on the contents of process data of the first number of bits, which is input to correspond to address data equivalent to the first address area.

With this method, when the number of storage devices is capable of outputting data at the first number of bits, all bits of the bit width will be valid for process data of the first number of bits, which is input corresponding to address data equivalent to the first address area. However, when the number of storage devices is not sufficient to output data at the first number of bits, some of the bits in the first bit width are invalid. Therefore, it is possible to accurately determine the number of storage devices based on the contents of the process data at the first number of bits.

BRIEF DESCRIPTION OF THE DRAWINGS

The above and other objects, features and advantages of the present invention will become more apparent from the following description when taken in conjunction with the accompanying drawings, in which:

FIG. 5 shows detailed address data for the first 0.5 MB of the address area CS#0, which is being read in 32-bit mode, and the 2 MB address area CS#1, which is being read in 16-bit mode;

DETAILED DESCRIPTION OF THE PREFERRED EMBODIMENTS

Figure 1:
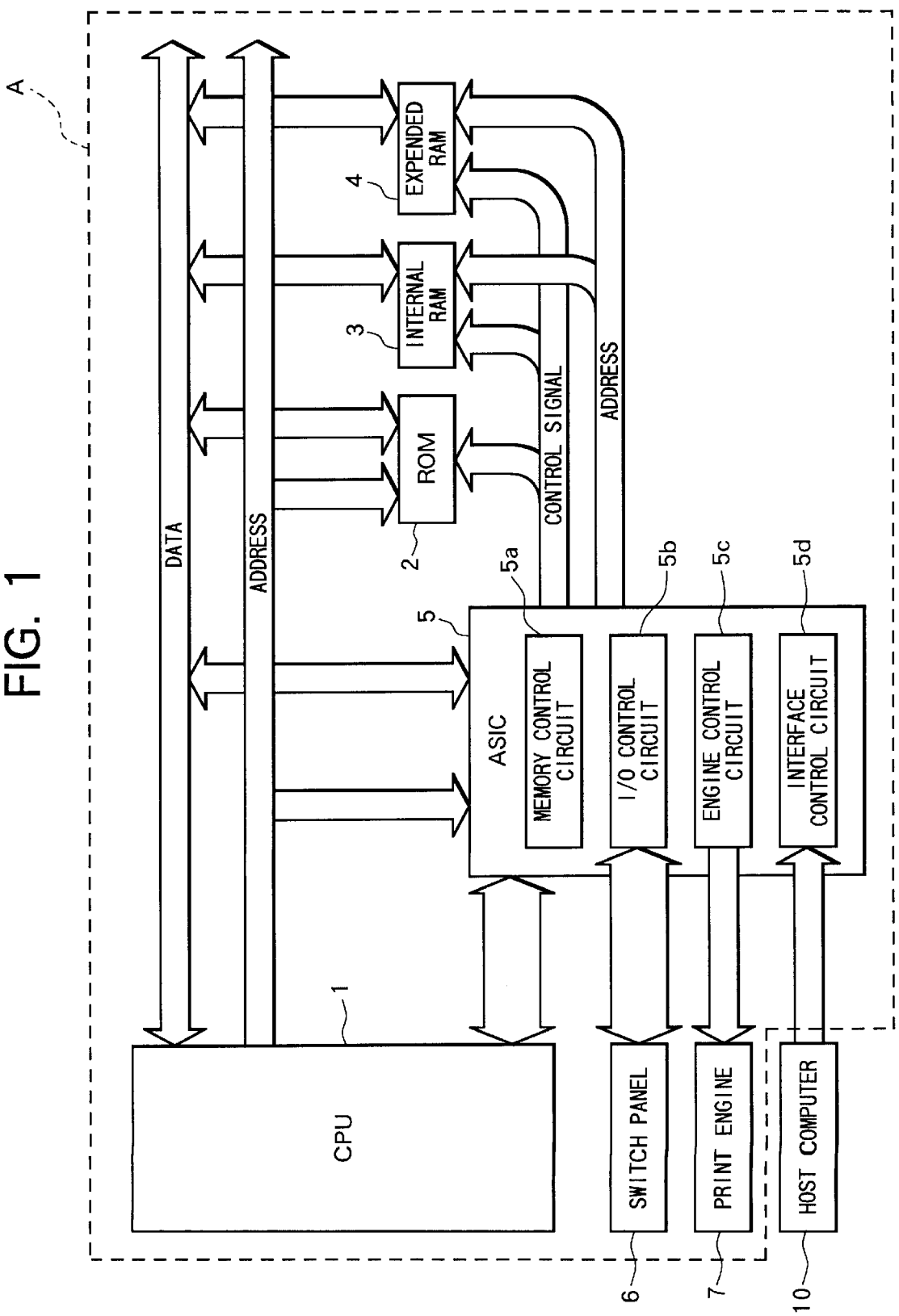
FIG. 1 is a block diagram showing the general construction of a data processing system according to a preferred embodiment of the present invention.

A data processing system and method of inputting data from storage devices in the data processing system according to a preferred embodiment of the present invention will be described while referring to the accompanying drawings. FIG. 1 shows the general construction of a print system, which is the data processing system of the present embodiment.

This print system is constructed of a printing device A, encircled by the dotted line in FIG. 1, and a host computer 10, which is a personal computer or the like connected to the printing device A. Print data output from the host computer 10 is stored temporarily in a RAM device of the printing device A. The printing device A performs a print operation by outputting video data generated based on this print data to a suitable printing engine.

Next, the construction of the printing device A will be described with reference to FIG. 1.

As shown in FIG. 1, the printing device A includes a CPU 1 for controlling various components of the printing device A; a ROM 2 for storing control programs and the like; an internal RAM 3 for providing the CPU 1 with a work area; an expanded RAM 4 for increasing the capacity of the internal RAM 3; an Application Specific Integrated Circuit (ASIC) 5 for reducing the processing load of the CPU 1; a switch panel 6 for displaying messages and settings; and a print engine 7 for forming images on a recording paper.

The CPU 1 controls the various components of the printing device A, performing such operations as outputting address data, inputting and outputting data between components assigned by the address, and inputting and outputting control signals for each component. The CPU 1 of the present embodiment employs a 32-bit data bus.

The ROM 2 is a memory device for storing control programs for the operations described above. In addition to executable programs, the ROM 2 stores table data and the like.

The internal RAM 3 is a storage device serving as both the main memory of the data processing system and as a work area required by the CPU 1 for performing calculations. The internal RAM 3 of the present embodiment is Dynamic Random Access Memory (DRAM) such as synchronous DRAM (SDRAM).

The expanded RAM 4 is a storage device that can be installed when the need arises in order to increase the capacity of the main memory. As with the internal RAM 3, the expanded RAM 4 is DRAM such as SDRAM The ASIC 5 is an IC circuit specific to this data processing system and is provided to perform data processing with the CPU 1 according to the present invention. The ASIC 5 includes a memory control circuit 5a for controlling the ROM 2 and internal RAM 3, as well as the expanded RAM 4; an I/O control circuit 5b for controlling the switch panel 6; an engine control circuit 5c for controlling the print engine 7; and an interface control circuit 5d for controlling communications with the host computer 10.

The CPU 1 inputs address data, I/O data, or control signals to each of the control circuits in the ASIC 5, where the data or control signals are processed or output to various devices.

The switch panel 6 includes a display device provided in a panel on the printing device A, switches, and the like. The switch panel 6 enables the operations of the printing device A to be set through operations of the switches, and displays error messages and the like on the display device.

The print engine 7 is an image forming device using either an electrophotographic method or an ink-jet method. The print engine 7 forms images on a recording paper based on video data output from the engine control circuit 5c.

Next, the configuration of the memory control portion for the print system described above will be described with reference to FIG. 2.

Figure 2:
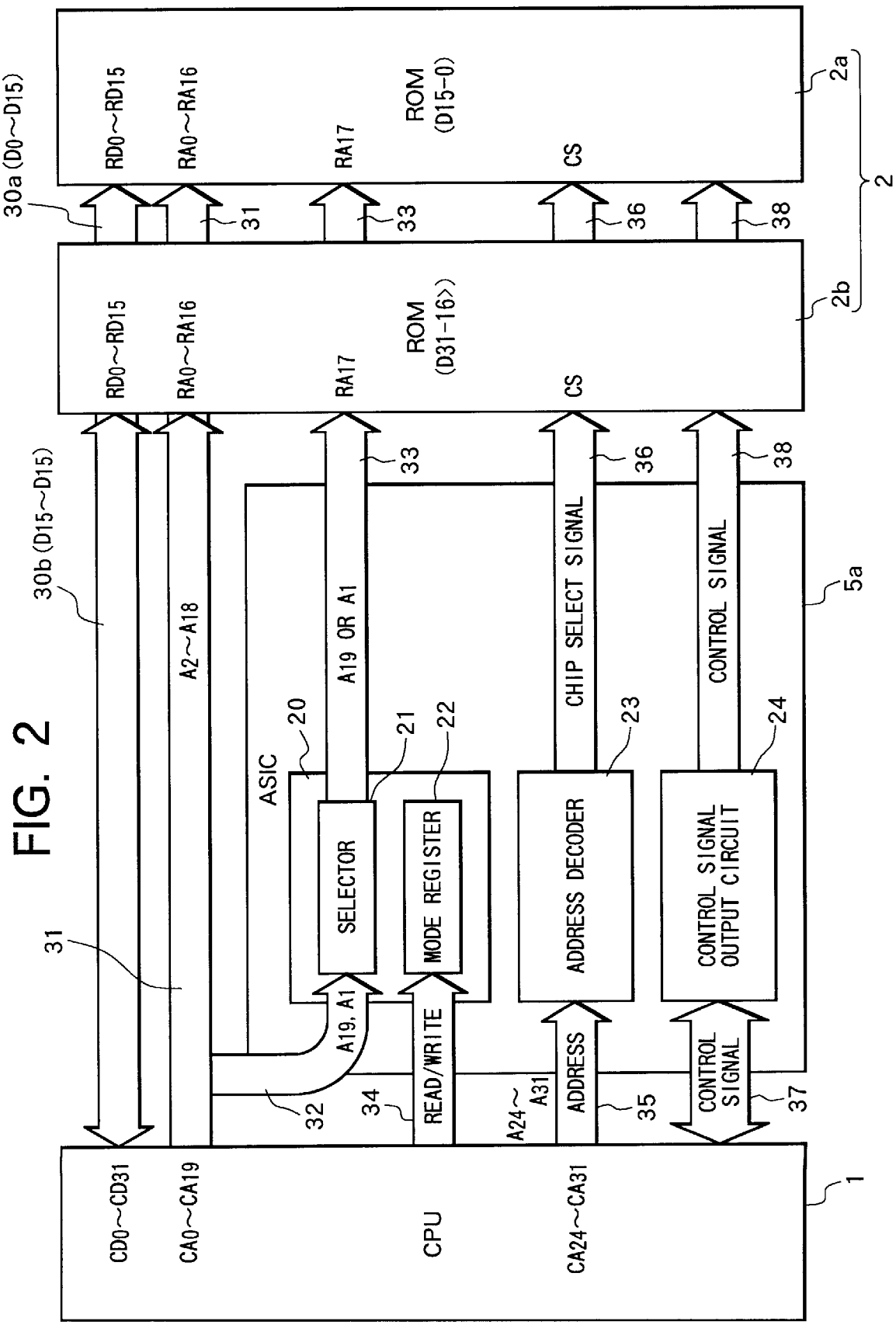
FIG. 2 is a block diagram showing the storage devices and device for controlling the storage devices extracted from FIG. 1.

FIG. 2 shows selected parts of the print system shown in FIG. 1, including the CPU 1, memory control circuit 5a of the ASIC 5, and ROM 2. In the present embodiment, the ROM 2 shown in FIG. 1 is separated into program ROM and data ROM, with only data ROMs 2a and 2b shown in FIG. 2.

In the present embodiment, flash memory is used for the ROMs 2a and 2b. Flash memory can be written to electrically. Each of the ROMs 2a and 2b have a capacity of 0.5 MB (256K words×16 bits). The ROMs 2a and 2b are connected to the CPU 1 via data buses 30a and 30b. Since the maximum data bus width for currently available flash memory is 16 bits, data terminals RD0–RD15 of the low-order ROM 2a are connected via the data bus 30a to data terminals CD0–CD15 of the CPU 1; and data terminals RD0–RD15 of the high-order ROM 2b are connected via the data bus 30b to data terminals CD16–CD31 of the CPU 1. With this construction, it is possible to perform 32-bit data writes and reads.

An address bus 31 is connected between address data terminals CA2–CA18 of the CPU 1 and address data terminals RA0–RA16 on each of the ROMs 2a and 2b for transferring address data. Further, the address data terminals CA19, which is used for the highest order bit of address data for ROM, is connected to the address data terminal RA17 of each of the ROMs 2a and 2b via an address bus 32, a selector 21, and an address bus 33.

The memory control circuit 5a includes an address selector 20, an address decoder 23, and a control signal output circuit 24.

The address selector 20 includes a selector 21 and a mode register 22, and supplies address data A19 or A1 to the address bus 33. An address bus 32 branches off from the address bus 31 and connects with the selector 21. The highest order bit A19 of address data for ROM and the lowest order bit A1 of the address data are supplied to the selector 21 via the address bus 32. The selector 21 selects one of these two address data after reading the contents of the mode register 22. The CPU 1 writes data to the mode register 22 via the read/write line 34. A more detailed description of the contents of this register will be given later.

Address data A24–A31 is output from the CPU 1 to the address decoder 23 via an address bus 35. Based on the address data A14–A31, the address decoder 23 determines whether the ROM 2a or the ROM 2b has been selected, and then outputs a chip select signal to the selected ROM via a chip select line 36.

Control signals are output from the CPU 1 to the control signal output circuit 24 via a control signal line 37. Based on these control signals, the control signal output circuit 24 outputs control signals to the ROM 2a or the ROM 2b via the control signal line 38 at a suitable timing.

With this construction, data is read from memory areas allocated in the ROMs 2a and 2b as follows. First, address data A2–A31 specifying the relevant memory area is output from the CPU 1. Since the CPU 1 of the present embodiment is a 32-bit CPU, address data A1 and A0 are not ordinarily output. After decoding the output data, the address decoder 23 outputs a chip select signal to the ROMs 2a and 2b, thereby enabling the ROMs 2a and 2b. Address data A2–A18 is supplied to the ROMs 2a and 2b via the address bus 31, while address data A19 is supplied to the same via the address bus 32, address selector 20, and address bus 33. Next, a control signal indicating a read operation is output from the CPU 1, and the control signal output circuit 24 outputs a control signal indicating a read operation to the ROMs 2a and 2b.

The same address data is output to both the ROMs 2a and 2b. However, the low-order two bytes of data corresponding to the address are stored in the low-order ROM 2a, while the high-order two bytes of data corresponding to the address are stored in the high-order ROM 2b. Accordingly, it is possible to read I/O data for a four-byte area beginning from the specified address. As an example, let us say that Address 0 is output by the CPU 1. The two bytes of data for the CPU 1 Address 0 and Address 1 are stored at Address 0 in the ROM 2a. The data is set as I/O data D0–D15 and output to the I/O data terminals RD0–RD15 of the ROM 2a. Further, the two bytes of data for the CPU 1 Address 2 and Address 3 are stored at Address 0 for the ROM 2b. This data is set as the I/O data D16–D31 of the high-order two bytes and output to the I/O data terminal RD0–RD15 of the ROM 2b. Next, Address 4 is output from the CPU 1. The two bytes of data Address 4 and Address 5 for the CPU 1 are stored at Address 1 of the ROM 2a. This data is set as I/O data D0–D15, which is output to the I/O data terminals RD0–RD15 of the ROM 2a. Also, the two bytes of data Address 6 and Address 7 for the CPU 1 are stored at Address 1 of the ROM 2b. This data is set as I/O data D16–D31 of the upper two bytes and output to the I/O data terminals RD0–RD15 of the ROM 2b.

In this way, 32 bits of data corresponding to the address output from the CPU 1 are output to the I/O data terminals RD0–RD15 of the ROMs 2a and 2b. The CPU 1 reads this data via the address bus 30.

According to the system described above, the CPU 1, having a data width of 32 bits, can read data even when using a ROM with a data bus width of 16 bits.

However, the size of the data stored on the data ROM varies greatly according to the user specifications. Therefore, there may be times when it is unnecessary to use two 0.5-MB ROM devices.

For example, the data ROM may store data for controlling the fixing temperature corresponding to a special paper thickness, data for special controls corresponding to particularly large-size paper, or font data for the characters of special languages. However, this data can vary greatly in size depending on the degree of thickness of the paper, the size of the paper, or types of characters of the language. Hence, there will be times when about 1 MB of data will be necessary and times when only about 0.5 MB of data is needed.

In the present embodiment, the system is configured to only require the mounting of one 0.5-MB ROM 2a, from which the 32-bit CPU can read data when only about 0.5 MB of data is required. This is accomplished by performing a 16-bit read twice from the single ROM.

The hardware configuration is the same as described earlier with reference to FIG. 2. However, when mounting only one ROM, the ROM is mounted in the position of the low-order ROM 2a.

Figure 3:
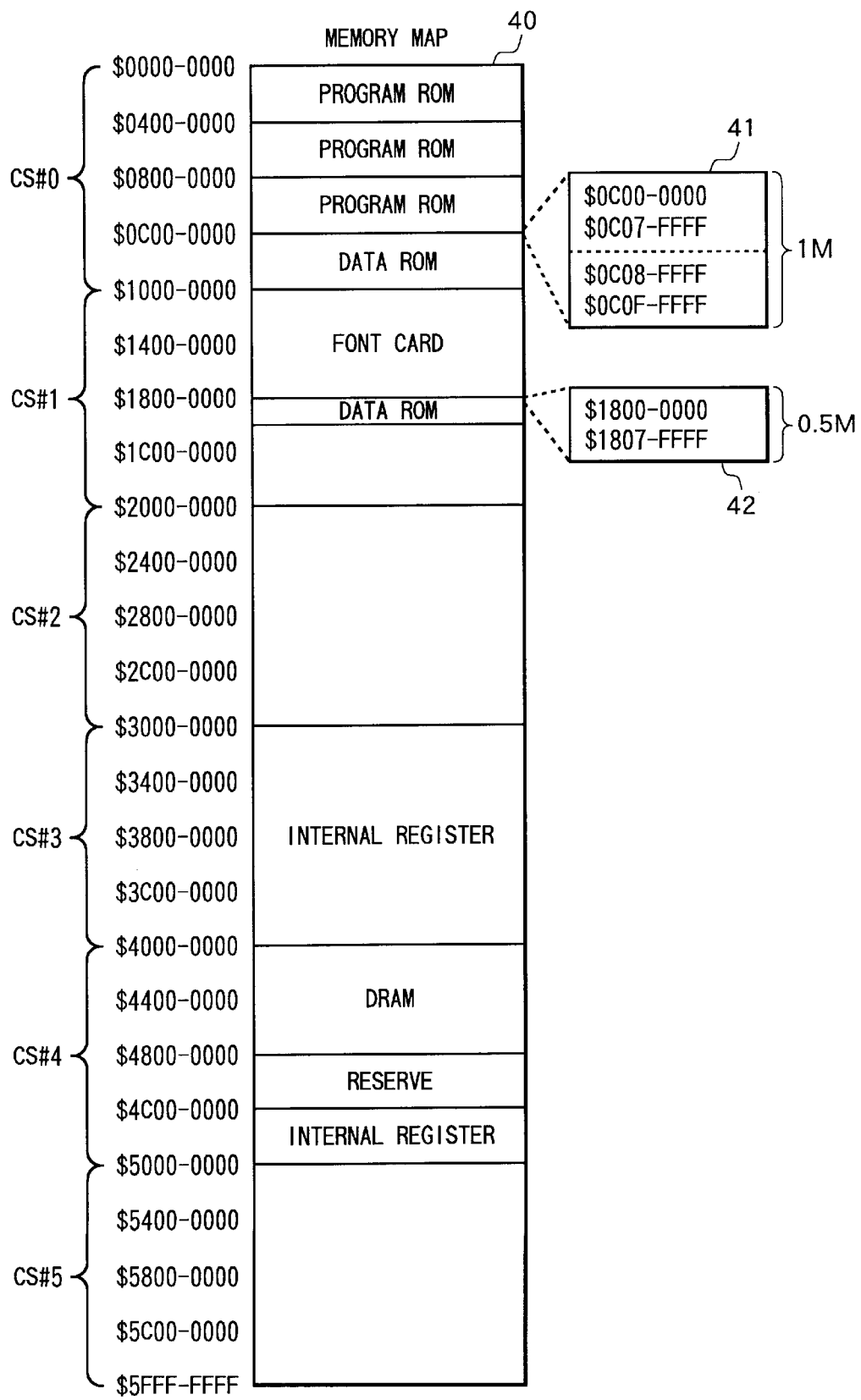
FIG. 3 is an explanatory diagram showing a memory map for the data processing system in FIG. 1.

A memory map 40 is shown in FIG. 3. In this memory map 40, data ROM areas are allocated in both areas CS#0, which is set to 32-bit bus mode, and CS#1, which is set to 16-bit bus mode. The system includes a control program to perform a ROM number determination process. Based on the result of the determination, the program allocates data ROM in either the area CS#0 when it is determined that two ROM devices are mounted or the areas CS#1 when it is determined that only one ROM device is mounted. Here, the 32-bit bus mode and 16-bit bus mode signify the operating mode of the CPU 1. In the 32-bit bus mode, the CPU 1 reads data at a 32-bit data bus width. In the 16-bit bus mode, the CPU 1 reads data at a 16-bit data bus width.

Figure 4:
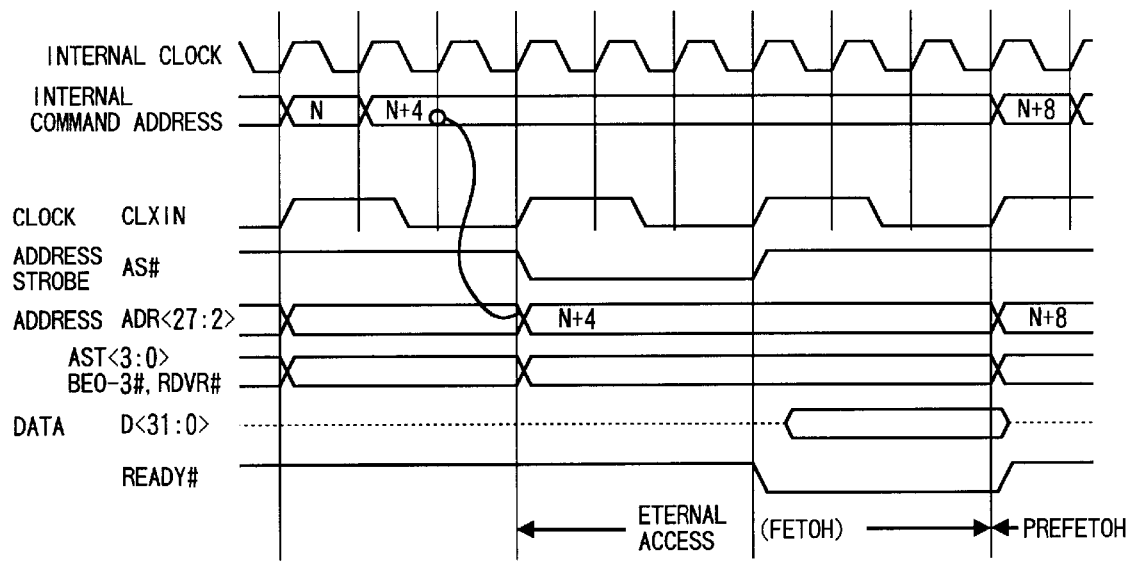
FIG. 4(a) is a timing chart showing the operations of a CPU of the data processing system that is operating in 32-bit bus mode.
FIG. 4(b) is a timing chart showing the operations of the CPU in 16-bit mode.
Figure 4:
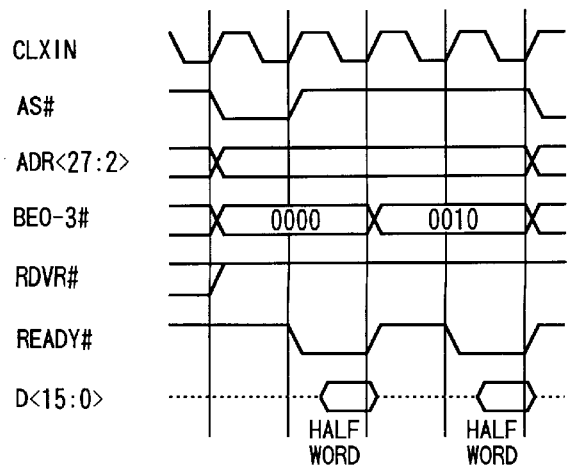

In other words, in the 32-bit bus mode, as shown in FIG. 4(a), 32 bits of data are read in one read cycle. In the 16-bit bus mode, shown in FIG. 4(b), 16 bits of data are read in one read cycle. As shown in the memory map 40 of FIG. 3, the CPU of the present embodiment is divided into areas CS#0–CS#5 and is configured to allow a bus mode to be set for each area by setting the level on the mode setting terminal (not shown) of the CPU 1 or by setting the value of internal setting registers of the CPU 1. In the present embodiment, area CS#1 is set to 16-bit bus mode, while all other areas are set to 32-bit bus mode.

As shown in a detailed memory map 41 from the area CS#0, a 1-MB area from address 0C000000 to address 0C0FFFFF is allocated for data ROM. As shown in a detailed memory map 42 from area CS#1, a 0.5-MB area from address 18000000 to address 1807FFFF is allocated for data ROM.

When the addresses are allocated in this way, FIG. 5 shows a comparison of the first 0.5-MB area beginning from 0C000000 of area CS#0 with the first 0.5-MB area beginning from 18000000 of area CS#1. As shown, the address A0–A18 have the same values.

The address 0C0FFFFC is the final 4-byte entry address of the area 0C000000–0C0FFFFF. The address 1807FFFC is the final 4-byte entry address of the area 18000000–1807FFFF.

In short, whether accessing the area CS#0 or the area CS#1, the same values of the address A0–A18 will be output for the first 2-MB of area. Accordingly, a common address bus can be used when only one ROM device is mounted or when two ROM devices are mounted.

However, when reading data in 16-bit amounts, the address A1 is the lowest-order address for ROM that is output by the CPU 1. It is necessary for this address A1 to be somehow provided to the ROM 2a.

When reading data by 32-bit amounts, the lowest-order address for ROM that is output by the CPU 1 is the address A2. As described above, the system of the present embodiment is configured such that the address terminal CA2 of the CPU 1 is connected to the lowest-order address terminal RA0 in the ROMs 2a and 2b.

Accordingly, the lowest-order address is different when reading in 16-bit mode and in 32-bit mode. Since a common hardware construction is used for both modes, it is possible to consider providing a means to switch the connection between the address bus 31 and the address terminal of the ROM. However, providing such a means would increase the complexity of the hardware configuration and is therefore not desirable.

Therefore, the system of the present embodiment is configured such that the CPU 1 supplies the highest-order address A19 for ROM to the high-order address terminal RA17 when reading in 32-bit mode, and supplies the lowest-order address A1 for ROM when reading in 16-bit mode.

Further, by supplying the lowest-order address A1 for ROM to the highest-order address terminal of ROM, the address progression within the ROM will become irregular. However, the data ROM used in the present embodiment is a writable Flash ROM. Therefore, data is first written from the CPU 1 to the ROM using this irregular address format. Hence, there will be no problem when reading the data. If for some reason, Flash ROM is not used, the address progression will be irregular. However, if the address is previously written in this irregular progression, there will be no problems in reading the data.

The selector 21 of the address selector 20 is responsible for selecting the address that is supplied to the highest-order address terminal RA17 of ROM. The system is configured to input the address A19 and A1 to the selector 21 via the address bus 32. Based on the mode type stored in the mode register 22 provided in the address selector 20, the selector 21 is configured to provided either the A19 or the A1 to the address bus 33.

This mode register 22 is connected to the CPU 1 via the read/write line 34. After performing the ROM number determination process, the CPU 1 writes the result of that determination to the mode register 22. Specifically, when it is determined that two ROM devices are mounted in the system, data specifying the 32-bit bus mode is written to the mode register 22. When it is determined that only one ROM device is mounted in the system, the CPU 1 writes data specifying the 16-bit bus mode to the mode register 22. If the selector 21 checks the mode register 22 and finds data specifying the 32-bit bus mode, the selector 21 provides the address A19 to the address bus 33. If the selector 21 finds data specifying the 16-bit bus mode, the selector 21 provides the address A1 to the address bus 33.

A system having the construction described above enables the CPU 1 to read data from ROM, whether there are two ROM devices or one ROM device mounted in the system, while using a common hardware configuration for both cases.

Next, the ROM number determination process of the present embodiment will be described with reference to FIGS. 6, 7(a) and 7(b).

Figure 6:
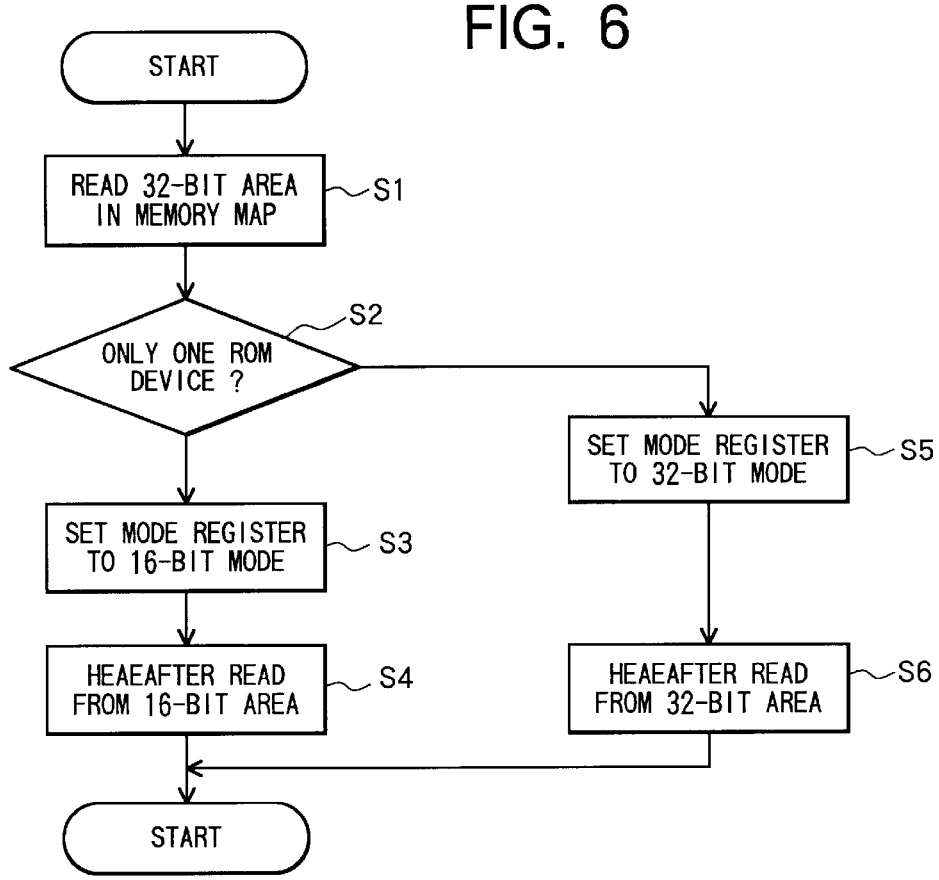
FIG. 6 is a flowchart for a ROM memory number determination process of the data processing system.
Figure 7:
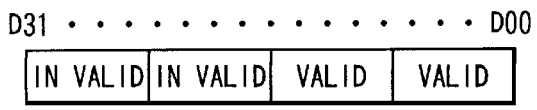
FIG. 7(a) is a diagram showing the effective data when one ROM device is mounted.
FIG. 7(b) is a diagram showing the effective data when two ROM devices are mounted.
Figure 7:
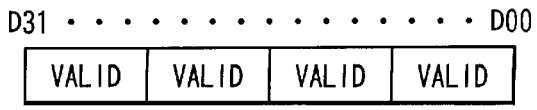

As shown in FIG. 6, in S1 the CPU 1 reads the 32-bit data ROM area in the memory map, that is address 0C000000 of area CS#0. At this time, if there are two ROM devices mounted in the system, then it is possible to read 32-bits of data at a time. Hence, all data D0–D31 is valid data, as shown in FIG. 7(b). However, if only one ROM device is mounted in the system, that is, the ROM 2b shown in FIG. 2 is not provided, then high-order data D16–D31, which corresponds to 0C000002 and 0C000003 is valid or invalid data.

In S2, the number of ROM devices is determined according to the method described above. If there is only one ROM device ("yes" in S2), then data specifying the 16-bit bus mode is set in the mode register 22 in S3. Thereafter, reading is performed in a 16-bit area from 18000000 of area CS#1 in S4. On the other hand, if there are two ROM devices in the system ("no" in S2), then data specifying the 32-bit bus mode is set in the mode register 22 in S5. Thereafter, reading is performed from a 32-bit area from 0C000000 of area CS#0 in S6.

In the present embodiment described above, when the contents for data ROM can be stored on one ROM device, then it is possible to provide only one ROM device and configure a data processing system to meet the user specifications using common hardware and software configurations. Therefore, when only one ROM device is required, it is possible to reduce the cost of the data processing system.

In the embodiment described above, the ROM used is 0.5-MB (256K words×16 bits) Flash ROM, of which two are used for 32-bit reading mode and only one is used for 16-bit reading mode. However, the present invention is not limited to these specifications. For example, other types of ROM besides Flash ROM can be used. The capacity of these ROM devices can also be greater than 0.5 MB. Further, the number of the ROM devices can be changed to suit the required capacity. In addition, the present invention can be applied to cases using other storage devices besides ROM.

In the embodiment described above, an example of a printer system was described for the data processing system. However, the present invention is not limited to printer systems, but can also apply to various other systems, including photocopying machines, word processors, and the like.

According to the data processing system of the present invention, the data processing device determines the number of storage devices mounted in the system. Based on the result of this determination, address data is output for the storage devices so as to input process data according to either a first mode or a second mode. In the first mode, the process data is input using the first address area at a first number of bits. In the second mode, process data is input using the second address area at a second number of bits, but is input a plurality of times in order to be equivalent to the first number of bits. Hence, regardless of whether there exist storage devices of a number capable of inputting process data at the first number of bits, it is possible to reliably input process data at the required first number of bits without changing the hardware and software constructions. Accordingly, it is possible to provide a system at low cost in which the number of storage devices can be modified to suit the user's specifications. Further, it is possible to attempt to lower the cost of the system by reducing the number of storage devices when suitable to the user's specifications.

According to the data processing system of the present invention, when the first number of bits is a multiple of the second number of bits, address data is generated for the storage devices by arranging a number of bits of low-order address data, which can express the multiple value, at the highest-order bit side. Therefore, data reads can be performed at the first number of bits or the second number of bits, without needing to change addressing of the storage devices. Accordingly, a system can be provided at low cost in which the number of storage devices can be changed according to the user's specifications.

According to the data processing system of the present invention, the data processing device determines and stores the bit width of the process data to be input from the storage devices, and based on the stored bit width selects either address data for reading at the first number of bits or address data for reading at the second number of bits. Accordingly, a system can be provided at low cost in which the number of storage devices can be modified according to the user's specifications without changing the hardware and software configurations.

According to the data processing system of the present invention, the number of storage devices is determined based on the contents of process data at the first number of bits, which is input in response to address data corresponding to the first address area. Accordingly, it is possible to accurately determine the number of storage devices and to accurately operate a system in which the number of storage devices can be modified according to the user's specifications without changing the hardware and software configurations.

According to the method for inputting data from storage devices of the present invention, the data processing device determines the number of storage devices mounted in the system. Based on the result of this determination, address data is output for the storage devices so as to input process data according to either a first mode or a second mode. In the first mode, the process data is input using the first address area at the first number of bits. In the second mode, process data is input using the second address area at a second number of bits, but is input a plurality of times in order to be equivalent to the first number of bits. Hence, regardless of whether there exist storage devices of a number capable of inputting process data at the first number of bits, it is possible to reliably input process data at the required first number of bits without changing the hardware and software constructions. Accordingly, it is possible to provide a system at low cost in which the number of storage devices can be modified to suit the user's specifications. Further, it is possible to attempt to lower the cost of the system by reducing the number of storage devices when suitable to the user's specifications.

According to the method for inputting data from storage devices of the present invention, when the first number of bits is a multiple of the second number of bits, address data is generated for the storage devices by arranging a number of bits of low-order address data capable of expressing the multiple value at the highest-order bit side. Therefore, data reads can be performed at the first number of bits or the second number of bits, without needing to change addressing of the storage devices. Accordingly, a system can be provided at low cost in which the number of storage devices can be changed according to the user's specifications.

According to the method for inputting data from storage devices of the present invention, the data processing system determines and stores the bit width of the process data to be input from the storage devices, and based on the stored bit width selects either address data for reading at the first number of bits or address data for reading at the second number of bits. Accordingly a system can be provided at low cost in which the number of storage devices can be modified according to the user's specifications without changing the hardware and software configurations.

According to the method for inputting data from storage devices of the present invention, the number of storage devices is determined based on the contents of process data at the first number of bits, which is input in response to address data corresponding to the first address area. Accordingly, it is possible to accurately determine the number of storage devices and to accurately operate a system in which the number of storage devices can be modified according to the user's specifications without changing the hardware and software configurations.

Although the present invention has been descried with respect to specific embodiments, it will be appreciated by one skilled in the art that a variety of changes may be made without departing from the scope of the invention. For example, certain features may be used independently of others and equivalents may be substituted all within the spirit and scope of the invention.

What is claimed is:

1. A data processing system comprising:
   a data processing unit that switches a process data input mode for each prescribed area in a total address space between a first mode, in which data is input at a first number of bits, and a second mode, in which data is input at the first number of bits by performing a plurality of inputs at a second number of bits smaller than the first number of bits;
   at least one storage device, each storage device outputting process data at the second number of bits; and
   an address data converter that converts address data for the at least one storage device,
   wherein the data processing unit comprises: address data output means for outputting address data for selecting an external device having a prescribed area allocated in the total address space; storage device number determination means for determining number of storage devices and outputting results of determination; and process data input means for inputting process data from the at least one storage device, using either a first address area by the first mode or a second address area by the second mode, based on the results of determination,
   wherein the address data converter comprises: address data extraction means for extracting address data and outputting the address data to the at least one storage device based on whether the address data from the data processing unit corresponds to the first address area or the second address area so that the process data is output from the at least one storage device either on the first number of bits basis or the second number of bits basis; and selecting means for outputting signals based on the address data to select the at least one storage device, and
   wherein the at least one storage device is connected to at least one connection device that connects to the address data extraction means via an address data line and the data processing unit via a process data line.

2. The data processing system according to claim 1, wherein when the storage device number determination means indicates that the number of storage devices is a number at which the process data can be input at the first number of bits, the process data input means inputs the process data from the storage device in the first mode using the first address area.

3. The data processing system according to claim 1, wherein when the storage device number determination means indicates that the number of storage devices is a number at which the process data can be input at the second number of bits, the process data input means inputs the process data from the storage device in the second mode using the second address area.

4. The data processing system according to claim 1, wherein the first number of bits is a multiple of the second number of bits.

5. The data processing system according to claim 4, wherein the address data extraction means generates address data for the at least one storage device by arranging low-order address data of a bit number capable of expressing a number of the multiple in the highest-order bit side.

6. The data processing system according to claim 1, wherein the data processing unit further comprises bit width determining means for determining, based on results of determination, the bit width of process data input from the at least one storage device, wherein the address data converter further comprises bit width data storage means for storing data regarding the bit width determined by the bit width determining means, and wherein the address data extraction means selects user address data necessary for selecting, based on bit width data stored in the bit width data storage means, either address data necessary for inducing a plurality of storage devices to output process data equivalent to the first number of bits or address data necessary for inducing a storage device to output process data at the second number of bits.

7. The data processing system according to claim 1, wherein the storage device number determination means determines the number based on the process data at the first number of bits, the process data being input to correspond to address data in the first address area.

8. A method for inputting data from storage devices in a data processing system, wherein the data processing system includes a data processing unit for switching a process data input mode for each prescribed area in a total address space between a first mode, in which data is input at a first number of bits, and a second mode, in which data is input at the first number of bits by performing a plurality of inputs at a second number of bits smaller than the first number of bits; storage devices for outputting process data at the second number of bits; and an address data converter for converting address data for the storage devices, the method comprising:

an outputting process for outputting address data to select external devices each having a prescribed address area allocated in the total address space;

a determining process for determining the number of storage devices;

an inputting process for inputting process data from the storage devices, using either a first address area by the first mode or a second address area by the second mode, based on the results of the determining process;

an address data extraction and outputting process for extracting necessary address data and outputting the necessary data to the storage devices based on whether the address data from the data processing device corresponds to the first address area or the second address area so that the process data is output from the storage devices either on the first number of bits basis or the second number of bits basis; and a selecting process for outputting signals selecting the storage device based on the address data.

9. The method according to claim 8, wherein when it is determined according to the determining process that the number of storage devices is a number at which process data can be input at the first number of bits, the process data input device inputs process data from the storage device in the first mode using the first address area.

10. The method according to claim 8, wherein when address data corresponding to the first address area is output from the data processing unit, the address data converter extracts address data needed to induce a plurality of storage devices to output process data equivalent to the amount of the first number of bits, and outputs the address data to the storage device.

11. The method according to claim 10, wherein based on the address data, the selection device outputs a selection signal for selecting the storage devices, and in response to the selection signal, the storage devices output process data equivalent to the first number of bits.

12. The method according to claim 8, wherein when it is determined according to the determining process that the number of storage devices is a number at which process data can be input at the second number of bits, the process data input device inputs process data from the storage device in the second mode using the second address area.

13. The method according to claim 12, wherein when the address data corresponding to the second address area is output from the data processing device, the address data converter extracts address data needed to induce a plurality of storage devices to output process data equivalent to the amount of the second number of bits, and outputs the address data to the storage device.

14. The method according to claim 13, wherein based on the address data, the selection device outputs a selection signal for selecting the storage devices, and in response to the selection signal, the storage devices output process data equivalent to the second number of bits.

15. The method according to claim 8, wherein the first number of bits is a multiple of the second number of bits.

16. The method according to claim 15, wherein the address data extracting and outputting process generates address data for the storage devices by arranging the low order address data of a bit number capable of expressing the value of the multiple number in the highest order bit.

17. The method according to claim 8, further comprising:

a bit width determining process for determining, based on results of the storage number determination process, the bit width of process data input from the storage devices;

a bit width data storing process for storing data regarding the bit width determined by the bit width determining process; and an address data selecting process for selecting, based on the stored bit width data, either address data necessary for causing a plurality of storage devices to output process data equivalent to the first number of bits or address data necessary for causing a storage device to output process data at the second number of bits.

18. The method according to claim 8, wherein the storage number determination process for determining the number of storage devices determines the number based on contents of the process data of the first number of bits, the process data being input to correspond to address data equivalent to the first address area.

* * * * *